(12) United States Patent
Bauer et al.

(10) Patent No.: US 6,421,722 B1
(45) Date of Patent: Jul. 16, 2002

(54) METHOD AND APPARATUS FOR PROVIDING INTERNETWORKING SERVICE RELIABILITY

(75) Inventors: Brian Bauer, Kanata; Richard Burke, Vanier; Shafiq Pirbhai, Kanata; Simon Nadezhdin, Nepean, all of (CA)

(73) Assignee: Alcatel Canada Inc.

( * ) Notice: Subject to any disclaimer, the term of this patent is extended or adjusted under 35 U.S.C. 154(b) by 0 days.

(21) Appl. No.: 09/303,372

(22) Filed: Apr. 30, 1999

(51) Int. Cl.[7] .............................................. G06F 13/00
(52) U.S. Cl. .......................... 709/224; 709/226; 714/4; 714/10
(58) Field of Search ............................... 709/223, 224, 709/226, 230; 714/4, 10, 13, 47

(56) References Cited

U.S. PATENT DOCUMENTS

| | | | |
|---|---|---|---|
| 5,432,926 A | * 7/1995 | Citron et al. | 714/4 |
| 5,761,505 A | * 6/1998 | Golson et al. | 713/100 |
| 5,983,270 A | * 11/1999 | Abraham et al. | 709/224 |
| 6,260,070 B1 | * 7/2001 | Shah | 709/230 |
| 6,286,052 B1 | * 9/2001 | McCloghrie et al. | 709/238 |
| 6,307,841 B1 | * 10/2001 | Rowles et al. | 370/252 |

* cited by examiner

*Primary Examiner*—Viet D. Vu

(57) ABSTRACT

A method and apparatus include processing for providing reliable internetworking services that begins by determining whether identified internetworking resources and identified intranetworking resources provide a reliable intranetworking service. For example, the internetworking service may be a communication, data transfer, file share, etc., between two or more users affiliated with different networks. The identified intranetworking resources are those links within each network to support the communication (i.e., the internetworking service) and the identified internetworking resources are those that couple the networks. The processing continues by determining whether the reliable internetworking service cannot be provided due to a failure of one of the identified intranetworking resource. When this occurs, the identified internetworking resources that are associated with the failed intranetworking resource are flagged. Having flagged the associated internetworking resources, a new internetworking service is established using newly identified intranetworking resources and newly identified internetworking resources. Such newly identified intranetworking resources and internetworking resources are exclusive of the flagged internetworking resources when possible.

28 Claims, 7 Drawing Sheets

METHOD AND APPARATUS FOR PROVIDING INTERNETWORKING SERVICE RELIABILITY

TECHNICAL FIELD OF THE INVENTION

This invention relates generally to communications networks and more particularly to providing reliable internetworking communications.

BACKGROUND OF THE INVENTION

Communication networks are known to include a plurality of switches that are interoperably coupled to support communications between users coupled to ports of the communication network. The users may be end-users such as personal computers, telephones, videophones, etc., or may be servers, routers, private branch exchange (PBX), etc. Such users communicate in various forms such as voice, data, or a combination thereof via communication paths supported by the communication networks. The communication paths may be established using dedicated links or allocating links upon receipt of communication requests.

Many communication networks include a network service controller such as the network service controller 46020 manufactured and distributed by Newbridge Networks Corporation. The network service controller (NSC) manages the communication network by establishing the dedicated communication links, performing diagnostics on switches and/or links within the network, and configuring the switches and/or links.

To expand coverage area of a communication network, several communication networks may be linked together. To support such linking, each communication network includes a plurality of network-to-network interfaces (NNI) and a plurality of user-to-network interface (UNI). As the names imply, the UNI allows a user to interface with the network(s) while the NNI provides coupling, on a one-to-one or a one-to-many basis, between networks. To further support the linking of multiple communication networks, a Multi-Network Service Controller (MNSC), such as the 48020 manufactured and distributed by Newbridge Networks Corporation, is included. The MNSC manages the resources of the outer edges of the network (i.e., the UNIs and NNIs). As part of the MNSC's management function, it establishes communication links between UNIs based on user request to form a communication path, which may be comprised of dedicated communication links (i.e., links that are permanently assigned) or allocated communication links (i.e., links that are assigned when needed). In either case, the MNSC manages the internetworking links (i.e., the links coupling the networks) and requests of the NSC to establish intranetworking links (i.e., the links within a network). At this point, the NSC establishes the intranetworking links to complete the communication path between the endpoint users.

An issue arises when an NSC is unable to establish an intranetworking communication link, or when an intranetworking link (i.e., resource) fails. Such failure may occur due to all resources being used, not having sufficient bandwidth to support the current request, the intranetworking communication resources are broken, etc. When an intranetworking resource fails, the NNSC is unaware of the type of failure, thus, to the MNSC, the communication path has failed and has no way to correct the failure. Only the NSC of the network containing the failed intranetworking resource(s) is aware of the type of failure and is the only entity capable of fixing the failure. As such, the NSC attempts to reestablish reliable intranetworking paths while the MNSC remains idle for this communication. Depending on the type of failure, it may take several hours to repair the intranetworking resource(s).

Therefore, a need exists for a method and apparatus for a Multi-Network Service Controller to provide reliable internetworking services when an intranetworking resource fails.

DETAILED DESCRIPTION OF A PREFERRED EMBODIMENT

Generally, the present invention provides a method and apparatus that includes processing for providing reliable internetworking services. Such processing begins by determining whether identified internetworking resources and identified intranetworking resources provide a reliable intranetworking service. For example, the internetworking service may be a communication, data transfer, file share, etc., between two or more users affiliated with different networks. The identified intranetworking resources are those links within each network to support the communication (i.e., the internetworking service) and the identified internetworking resources are those that couple the networks. The processing continues by determining whether the reliable internetworking service cannot be provided due to a failure of one of the identified intranetworking resource. When this occurs, the identified internetworking resources that are associated with the failed intranetworking resource are flagged. Having flagged the associated internetworking resources, a new internetworking service is established using newly identified intranetworking resources and newly identified internetworking resources. Such newly identified intranetworking resources and internetworking resources are exclusive of the flagged internetworking resources, when possible. For example, the newly internetworking service may be a communication path that is established using different intranetworking resources (i.e., different links within the network) and different internetworking resources than in the failed communication path. With such a method and apparatus, reliable internetworking services can be provided by a multi-network service controller when communication links (i.e., intranetworking resources) within a network fail.

Figure 1:
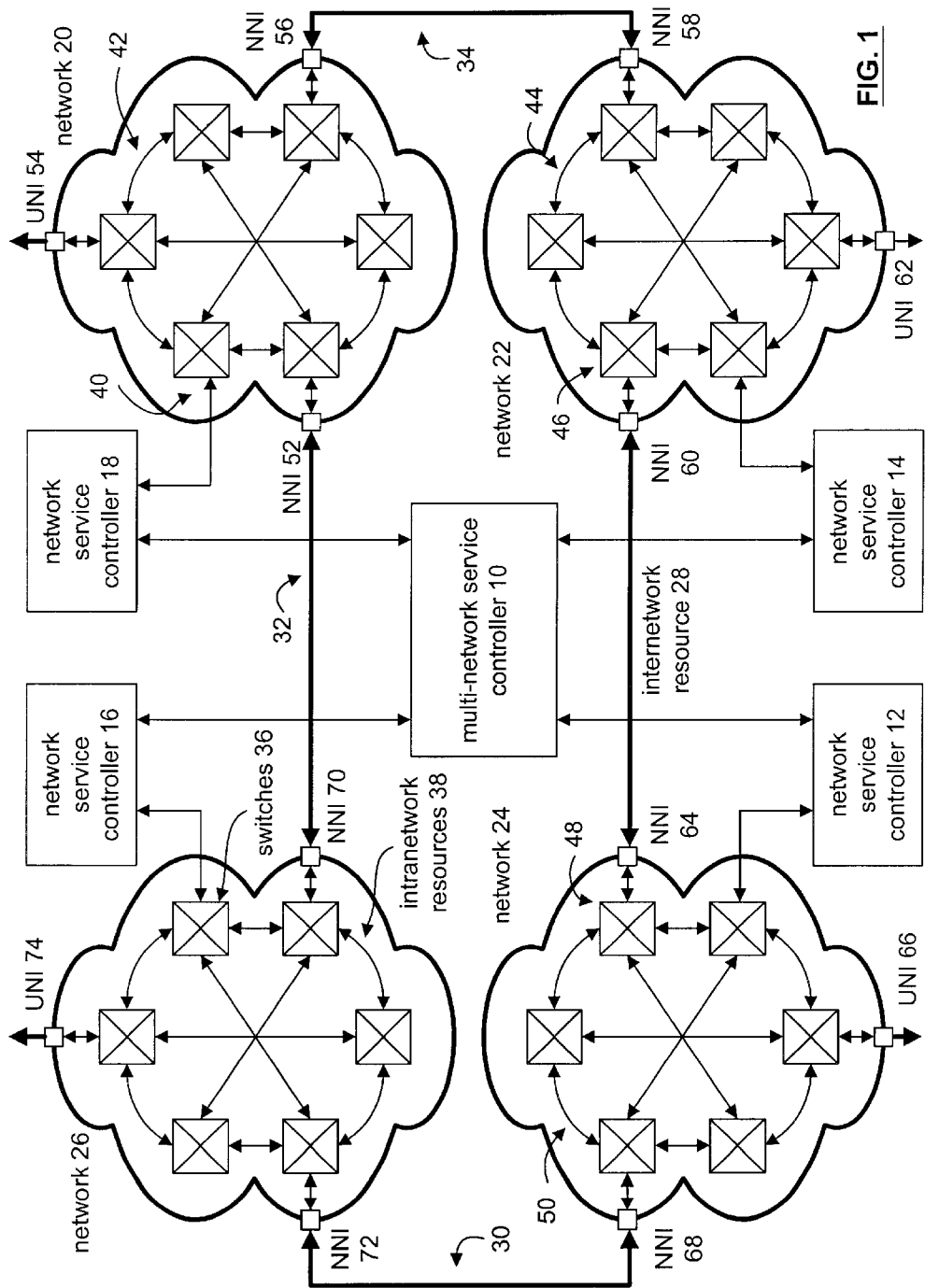
FIG. 1 illustrates a schematic block diagram of a plurality of networks to support internetworking services in accordance with the present invention.

The present invention can be more fully described with reference to FIGS. 1–7. FIG. 1 illustrates a schematic block diagram of a plurality of networks 20–26 operably coupled to a multi-network service controller 10 and a plurality of network service controllers 12–18. Each of the networks 20–26 include a plurality of switches 36, 40, 46, and 48 that are interoperably coupled to provide communication links between the switches and network ports, such as user-to-network interface ports 74, 54, 62, and 66 and network-to-network interface ports 52, 56, 58, 60, 64, 68, 70, and 72. The coupling between each switch is referred to as an intranetworking resource 38, 42, 44, and 50, or as a communication link. Such switches may be the 36120 manufactured and distributed by Newbridge Networks, which supports frame relay communications, or the 36170 which supports frame relay to ATM communications. As one of average skill in the art will appreciate, other types of transport protocols may be used.

Network service controller (NSC) 12 is operably coupled to network 24 and to the multi-network service controller 10. The network service controller 12 may be a 46020 network service controller as manufactured and distributed by Newbridge Networks, which includes functionality that is in accordance with the teachings of the present invention. As shown, NSC 12 manages the intranetworking resources 50 of network 24. Similarly, NSC 14 manages the intranetworking resources 44 of network 22, while NCS 18 manages the intranetworking resource 42 of network 20, and NCS 16 manages the intranetworking resources 38 of network 26.

The multi-network service controller (MNSC) 10 is operably coupled to each of the network service controllers 12–18. The MNSC 10 may be the 48020 as manufactured and distributed by Newbridge Networks, which includes functionality that is in accordance with the teachings of the present invention. In general, the MNSC 10 manages the internetworking resources 28, 30, 32, and 34. Such internetworking resources couple the networks together via the network-to-network interface ports 52, 56, 68, 60, 64, 68, 70, and 72. In addition, the MNSC also manages the user-to-network interfaces 54, 62, 66, and 74. As such, when a user requests that a communication path be established between multiple networks, the MNSC allocates the particular UNIs and NNIs to establish the internetworking service. The associated NSCs 12–18 of the networks 20–26 involved in establishing and supporting the internetworking service (e.g., a communication) manage the intranetworking resources of their respective networks.

Figure 2:
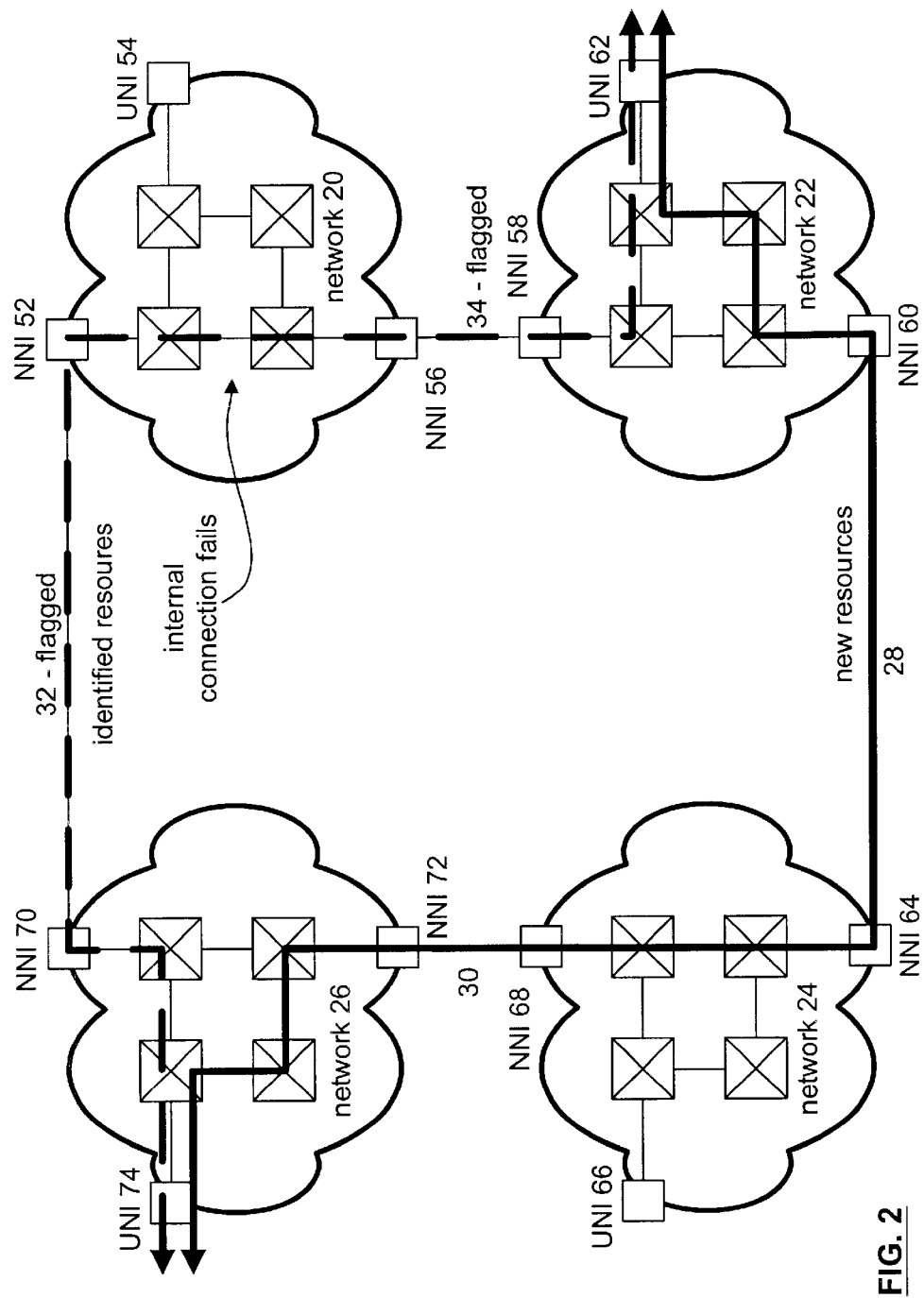
FIG. 2 illustrates a schematic block diagram of an example of providing reliable internetworking services in accordance with the present invention.

FIG. 2 illustrates an example of an initial establishment of a communication service as represented by the heavy dotted line between UNI 74 of network 26 to UNI 62 of network 22. Such a connection represents the initial internetworking service, which may be established in a variety of ways. For example, the service may be established via a dedicated communication path (i.e., private virtual circuit), established via a communication path for a particular request, established via a communication path for network overhead data transportation or for another type of data transportation, and/or for any other type of service supported by the networks singly or in combination.

As shown, the initial internetworking service is via two switches within network 26 and is coupled to network 20 via the NNI 70 and NNI 52. Network 22 is coupled to network 20 via NNI 56 and 58. As previously mentioned, the NSCs are responsible for establishing the intranetworking resources (i.e., allocation of switches and/or links supported by these switches). In this example, a link within network 20 fails, causing the internetworking service to become unreliable. In this instance, the MNSC 10 flags internetworking resources 32 and 34 as being coupled to the intranetworking resource that has failed. Having flagged the failed internetworking resources, the MNSC attempts to establish a new internetworking service (e.g., a new communication path) between the users without using the flagged internetworking resources, if possible. Note that the flagging of internetworking resources is done on a service-by-service basis. For example, if another call were to be established via different users that utilize UNI 74 and UNI 62, the internetworking resources 34 and 32 would not be initially flagged for the establishment of the new call.

In this example, the newly established internetworking service is illustrated by the solid heavy line between UNI 74 of network 26 and UNI 62 of network 22. As shown, network 26 is operably coupled now to network 24 via internetworking resource 30. Network 24 is coupled to network 22 via new internetworking resource 28. The establishment of the intranetworking resources (i.e., the allocation of communication links with the networks) is performed by the associated NSCs.

Figure 3:
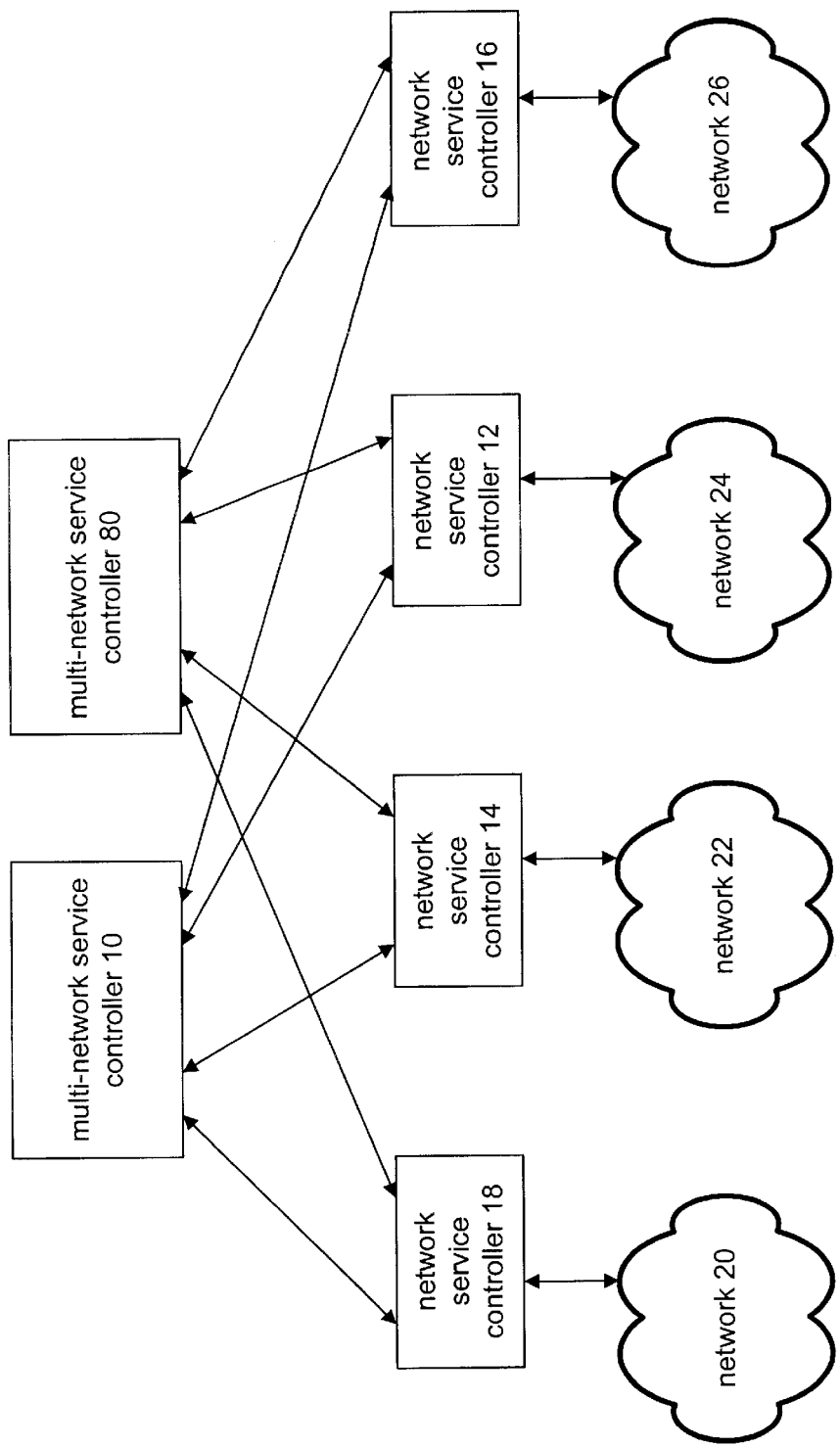
FIG. 3 illustrates a schematic block diagram of a plurality of networks operable coupled to a plurality of multi-network service controllers in accordance with the present invention.

FIG. 3 illustrates the plurality of communication networks 20–26, the plurality of network service controllers 12–18, operably coupled to a plurality of multi-network service controllers 10 and 80. In the embodiment of FIG. 3, the multiple MNSCs 10 and 80 each control portions of each of the networks that support their clientele. For example, one MNSC may be owned and operated by one telephone company while the other may be owned and operated by a different telephone company. The telephone companies share the resources of networks 20–26 to reduce the cost of communications.

Figure 4:
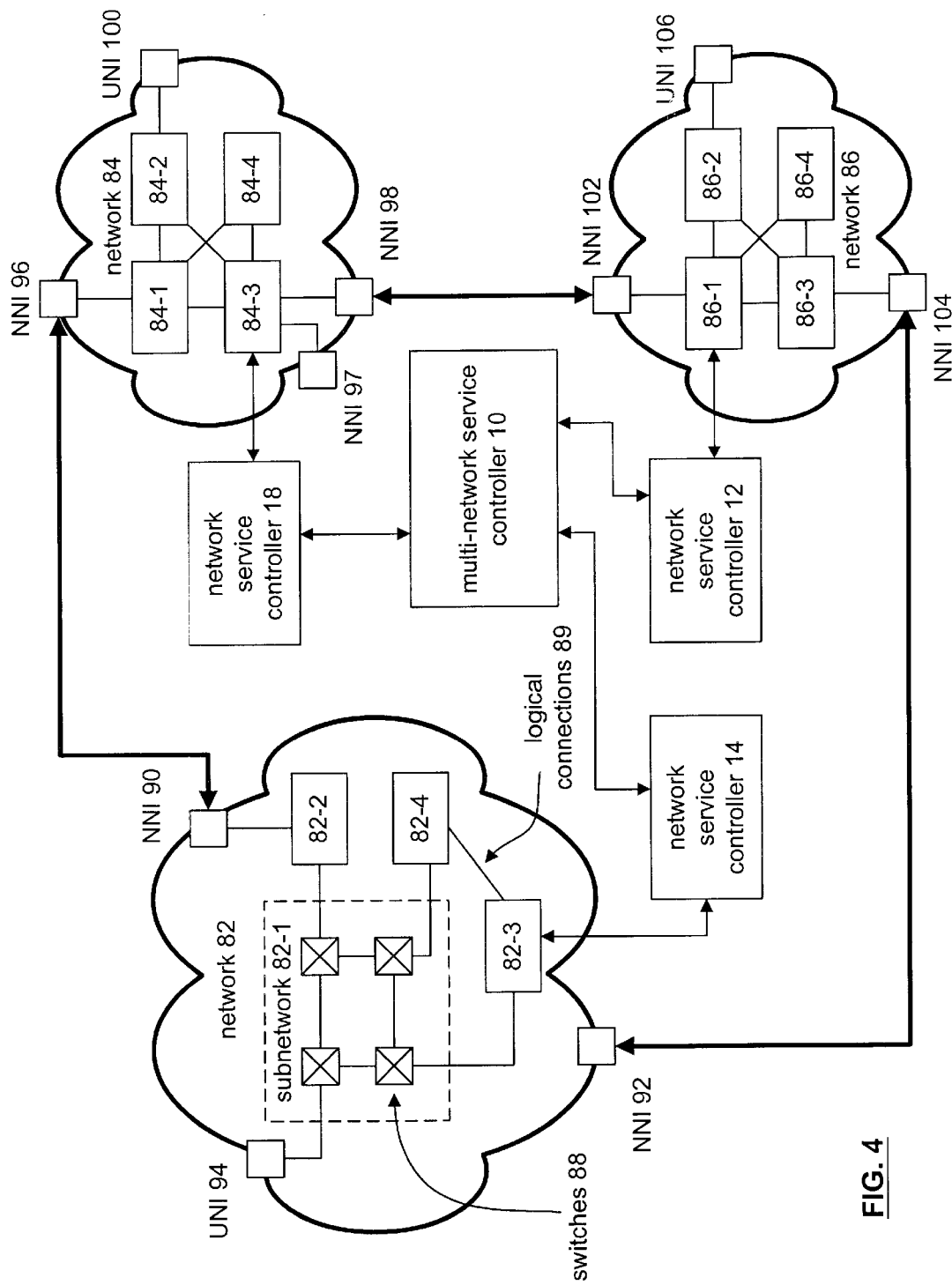
FIG. 4 illustrates a schematic block diagram of a plurality of networks that include sub-networks in accordance with the present invention.

FIG. 4 illustrates a schematic block diagram of a plurality of network 82–84, operably coupled to associated NSCs 12, 14, 18 and operably coupled to MNSC 10. As shown, each of the networks 82–86 includes a plurality of sub-networks 82-1 through 82-4, 84-1 through 84-4, and 86-1 through 86-4 that are logically coupled via logical connections 89. Accordingly, the networks are not physically divided in subnetworks, but logically to provide finer granularity when re-routing services. In this embodiment, the multi-network service controller is provided with information regarding the sub-networks, such that the MNSC may establish internetworking services by defining sub-network resources to be utilized. The sub-network resources are internally controlled by the associated network service controller 12, 14, 18.

Figure 5:
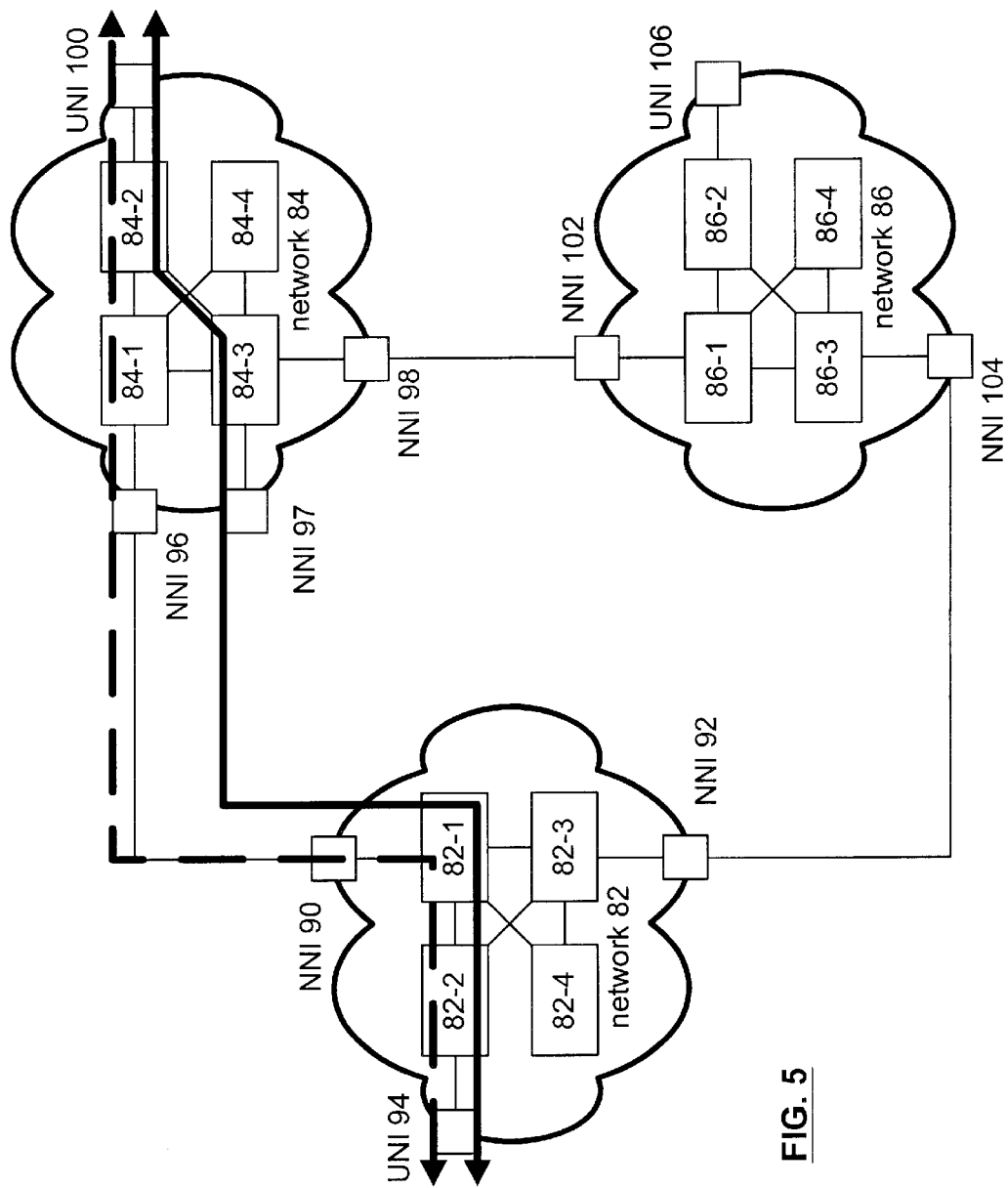
FIG. 5 illustrates a schematic block diagram of an example of providing reliable internetworking services within networks having sub-networks in accordance with the present invention.

FIG. 5 illustrates an example of the MNSC providing reliable internetworking services within networks that include a plurality of sub-networks. In this illustration, the initial internetworking service is illustrated by the heavy dashed line between UNI 94 of network 82 and UNI 100 of network 84. In this illustration, a failure occurred within sub-network 84-1. Accordingly, the MNSC flags the logical connections of sub-network 84-1. As such, the logical connection of the sub-network 84-1 to NNI 96 is flagged, as is the logical connection to subnetworks 84-2, 84-3 and 84-4. Having flagged these links (i.e., intranetworking resources), the MNSC establishes a new communication path as illustrated by the solid heavy line. The internetworking resources and intranetworking resources of the newly established internetworking service are not flagged for this particular call. By comparing the illustration of the FIG. 5 with that of FIG. 2, the dividing of networks into sub-networks, provides the MNSC with greater flexibility in establishing new internetworking services. As in the example of FIG. 2, when an intranetworking resource failed within the network, the network was typically unavailable for the newly established internetworking service. In contrast, by subdividing the network, network 84 is still available for supporting the newly established internetworking service, but using different sub-network portions.

When the MNSC is establishing the new internetworking service, it follows several guidelines when working with sub-network internetworking resources. The guidelines include maintaining a list of flagged internetworking resources for each internetworking service (e.g., a call) which is segment rerouted. A link (i.e., an internetworking resource) is added to the list if it is full, is fractional, or is a logic link on the MNSC level and is adjacent to a device containing the end point of a failed segment. For example, if a DS0 is a segment endpoint, the full and all the fractional links originating on the parent DS1 device will be flagged. If a DS0 is a frame relay segment endpoint, all the frame relay links passing through the parent DS1 device will be flagged. Note that marking of the links influences the routing only of the service (e.g., call) on whose list they are maintained and not the routing of any other service. The MNSC deletes the flag list for a service when the service becomes connected or when a certain number of segment reroute attempts have passed.

When a service has both endpoints within the same sub-network, the service cannot be segment rerouted unless the new route goes out via an NNI and into the sub-network over some internetworking links. For example, if both endpoints were contained within sub-network 82-2, and a failure occurred within the sub-network, the segment rerouting would require internetworking resources to be incorporated. For example, in FIG. 5 the internetworking resource coupled between NNI 90 and NNI 96 of network 84 would need to be utilized. Intranetworking resources of sub-network 84-1, -2, -3 and/or -4 would need to be allocated and internetworking resource between NNI 98 of network 84 and NNI 102 of network 86 would be allocated. Additionally, internetworking resources of sub-network 86-1, -2, -3, and/or -4 would need to be allocated such that the internetworking resource between NNI 92 of network 82 and NNI 104 of network 86 completes the coupling to network 82. Having completed the internetworking coupling, additional intranetworking resources of network 82 would need to be established to perform the segment rerouting.

As one of average skill in the art will appreciate, a new internetworking service can be established without the use of flagged links in many ways. As further example, when a service spans a single network and reliability of the service becomes an issue, the service may be re-routed outside that network onto the backbone of the network. Other re-routing options may readily be derived from the examples presented and such other re-routing options are far too numerous to individually mention.

Figure 6:
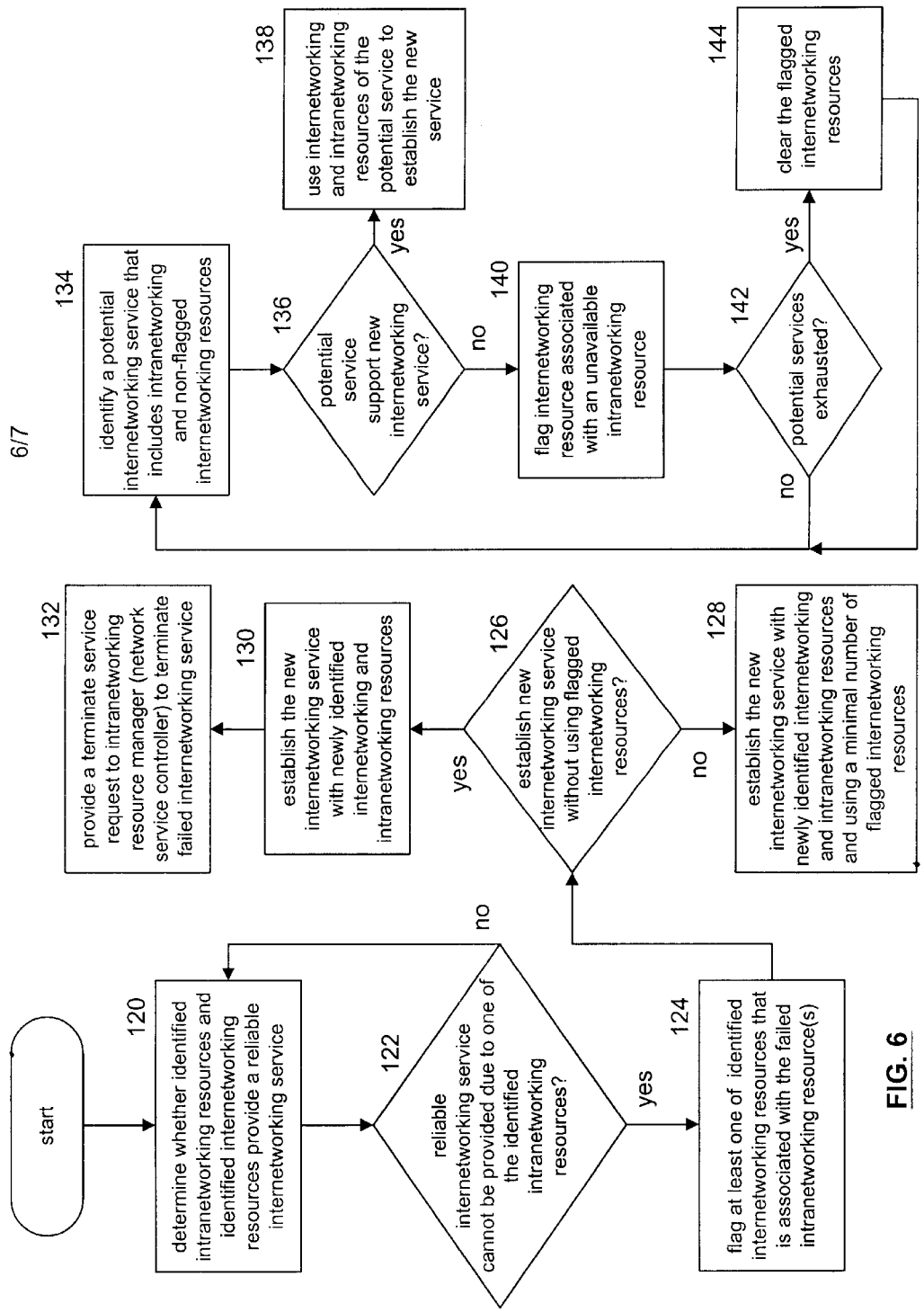
FIG. 6 illustrates a logic diagram of a method for providing reliable internetworking services in accordance with the present invention.

FIG. 6 illustrates a logic diagram of the method for providing reliable internetworking services. The process begins at step 120 where a determination is made as to whether identified intranetworking resources and identified internetworking resources provide a reliable internetworking service. The identified intranetworking resources and internetworking resources may be identified when a service request is received to establish the reliable internetworking service (i.e., establish a logical communication path via simulation prior to allocation) or when the reliable internetworking service is established (i.e., test after allocation of resources). The determination that an intranetworking resource has failed may be received from a network resource manager, i.e., an NSC, affiliated with the unreliable intranetworking resource.

The process then proceeds to step 122 where a determination is made as to whether a reliable internetworking service cannot be provided due to one of the identified intranetworking resources. If the internetworking service can be provided, the process repeats at step 120. If, however, the internetworking service cannot reliably be provided, the process proceeds to step 124. At step 124, at least one of the identified internetworking resources that are associated with the failed intranetworking resources is flagged. An identified internetworking resource is associated with the failed, or unreliable, intranetworking resource by being adjacent thereto. This was illustrated in FIGS. 2 and 5.

The process then proceeds to step 126 where a determination is made as to whether a new internetworking service can be established without using flagged internetworking resources. If so, the process proceeds to step 130 where the new internetworking service is provided with the newly identified internetworking and intranetworking resources. The process then proceeds to step 132 where a terminate service request is provided to the NSC to terminate the initial internetworking service. Such a termination request instructs the NSC to de-allocate the initially identified intranetworking resources that were supporting the internetworking service.

If, however, the new internetworking service cannot be established without using flagged internetworking resources, the process proceeds to step 128. At step 128, the new internetworking service is established using a minimum number of flagged internetworking resources. As one of average skill in the art will appreciate, the processing steps 120 through 132 may be done on a service-by-service basis and are executed by the MNSC, which may be a personal computer, work station, or includes processing circuitry and memory to store and execute programming instructions according to the logical steps of FIG. 6.

Steps 134 through 144 illustrate the determination process of establishing the new internetworking service. At step 134, a potential internetworking service (e.g., a potential communication path between endpoints) is identified that includes intranetworking resources and non-flagged internetworking resources. The process then proceeds to step 136 where the determination is made as to whether the potential internetworking service can support the new internetworking service. If so, the internetworking resources and the intranetworking resources are allocated at step 138.

If, however, the internetworking resources of the potential internetworking service cannot support the new internetworking service, the process proceeds to step 140. At step 140, the internetworking resources that are unable to support the new internetworking service are flagged. The process then proceeds to step 142 where a determination is made as to whether all potential internetworking services have been exhausted. If not, the process repeats at step 134. If, however, the potential internetworking services have been exhausted, the process proceeds to step 144. At step 144, the flagged internetworking resources are cleared and the process repeats at step 134. Alternatively, the originally allocated internetworking resources and intranetworking resources may be maintained and the service queued until such resource become available.

Figure 7:
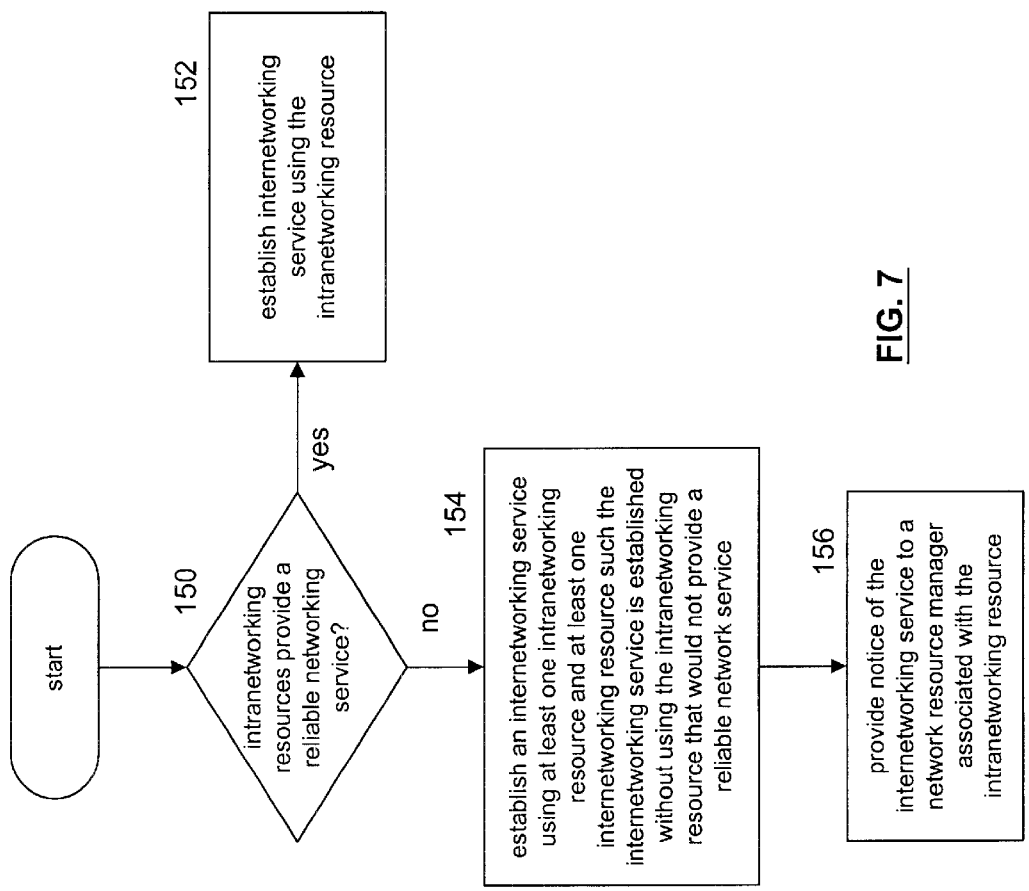
FIG. 7 illustrates a logic diagram of an alternate method for providing reliable internetworking services.

FIG. 7 illustrates a logic diagram of an alternate method for providing reliable internetworking services. The process begins at step 150 where a determination is made as to whether intranetworking resources provide a reliable networking service. Note that the intranetworking resources may include a plurality of logical sub-internetworking resources, as shown in FIGS. 4 and 5. The determination that an intranetworking resource is unavailable may be determined based on lack or available bandwidth, cost of links, failed links, excessive link delays, etc.

If the intranetworking resources provide a reliable internetworking service, the process proceeds to step 152 where the internetworking service is established using the intranetworking resources. If not, the process proceeds to step 154 where an internetworking service is established using at least one intranetworking resource and at least one internetworking resource such that the internetworking resource is established without using the intranetworking resource that would not provide a reliable service. This was discussed with reference to FIG. 5 and is further illustrated with respect to steps 134 through 144 of FIG. 6. The process then proceeds to step 156 where notice is provided of the internetworking service to a network resource manager associated with the intranetworking resource.

The preceding discussion has presented a method and apparatus for providing reliable internetworking services. Such services include dedicated communication paths, diagnostics, per-call requests, and/or any other service supported by a communication network. By allowing the MNSC to reallocate internetworking resources for a particular service, substantial improvement in service quality may be obtained in comparison to past embodiments where it was entirely up to the individual NSC to repair unreliable intranetworking resources. As one of average skill in the art will readily appreciate, other embodiments of the present invention may be readily derived from the teachings contained herein without deviating from the scope of the claims.

What is claimed is:

1. A method for providing internetworking service reliability, the method comprises the steps of:
   a) determining whether identified intranetworking resources of a plurality of intranetworking services and identified internetworking resources of a plurality of internetworking resources provide a reliable internetworking service;
   b) when the reliable internetworking service cannot be provided due to at least one of the identified intranetworking resources, flagging at least one of the identified internetworking resources that is associated with the at least one of the intranetworking resources to produce at least one flagged internetworking resource; and
   c) establishing a new internetworking service using newly identified intranetworking resources of the plurality of intranetworking resources and newly identified internetworking resources of the plurality of internetworking resources, wherein the newly identified intranetworking resources are exclusive of the at least one intranetworking resource and the newly identified internetworking resources are exclusive of the at least one flagged internetworking resource when the new internetworking service can be established with exclusion of the at least one flagged internetworking resource.

2. The method of claim 1 further comprises when the new internetworking service cannot be established with exclusion of the at least one flagged internetworking resource, establishing the new internetworking service with a minimal number of a plurality of flagged internetworking resources, wherein the at least one flagged internetworking resource includes the plurality of flagged internetworking resources.

3. The method of claim 1, wherein step (c) further comprises determining the new internetworking service based on at least one of exclusion of the at least one flagged internetworking resource, cost of the internetworking and intranetworking resources, minimal number of hops between the internetworking and intranetworking resources, load balancing of the internetworking and intranetworking resources, and bandwidth of the internetworking and intranetworking resources.

4. The method of claim 1 further comprises providing a terminate service request to intranetworking resource manager when the new internetworking service is established.

5. The method of claim 1, wherein step (c) further comprises:
   performing a loop function to establish the new internetworking service, wherein the loop function includes:
      identifying a potential internetworking service that includes intranetworking resources of the plurality of intranetworking resources and non-flagged internetworking resources of the plurality of internetworking resources;
      determining whether the potential internetworking service will not support the new internetworking service due to at least one of the intranetworking resources;
      when the potential internetworking service will not support the new internetworking service: flagging at least one of the internetworking resources associated with the at least one internetworking resources, and returning to the beginning of the loop function when the plurality of internetworking resources has not been substantially exhausted; and
      when the potential internetworking service will support the new internetworking service, ending the loop function.

6. The method of claim 5 further comprises clearing the flagging of the internetworking resources when the plurality of internetworking resources has been substantially exhausted and repeating the loop function.

7. The method of claim 1 further comprises, for each of a plurality of internetworking services:
   independently determining whether corresponding intranetworking resources of the plurality of intranetworking services and corresponding internetworking resources of the plurality of internetworking resources provides a correspondingly reliable internetworking service, wherein the reliable internetworking services is one of the plurality of internetworking services;
   when the correspondingly reliable internetworking service cannot be provided due to at least one of the corresponding intranetworking resources, flagging at least one of the corresponding internetworking resources that is associated with the at least one of the corresponding intranetworking resources to produce at least one flagged corresponding internetworking resource; and
   establishing a correspondingly new internetworking service using newly identified corresponding intranetworking resources of the plurality of intranetworking services and newly identified corresponding internetworking resources of the plurality of internetworking resources, wherein the newly identified corresponding intranetworking resources are exclusive of the at least one corresponding intranetworking resource and the newly identified corresponding internetworking resources are exclusive of the at least one flagged corresponding internetworking resource when the new internetworking service can be established with exclusion of the at least one flagged corresponding internetworking resource.

8. The method of claim 1 further comprises at least one of:
   identifying the identified intranetworking resources and the identified internetworking resources when a service request is received to establish the reliable internetworking service; and identifying the identified intranetworking resources and the identified internetworking resources when the reliable internetworking service is established.

9. The method of claim 1, wherein step (a) further comprises:

receiving an indication from a network resource manager affiliated with the at least one of the identified intranetworking resources that the at least one of the identified intranetworking resources is unreliable for supporting the reliable internetworking service, wherein the network resource manager is one of a plurality of network resource managers, wherein each network resource manager manages at least one corresponding one of the plurality of intranetworking resources.

10. A method for providing networking service reliability, the method comprises the steps of:

a) determining whether an intranetworking resource provides a reliable networking service; and b) when the reliable networking service cannot be provided by the intranetworking resource, establishing an internetworking service using at least one intranetworking resource of a plurality of intranetworking resources and at least one internetworking resource of the plurality of internetworking resources, wherein the at least one intranetworking resource is exclusive of the intranetworking resource.

11. The method of claim 10, wherein the intranetworking resource includes a plurality of logical sub-intranetworking resources.

12. The method of claim 11 further comprises determining that the intranetworking resource is unable to provide the reliable networking service based on at least one of:

first and second user network interfaces of the reliable networking service are respectively coupled to first and second logical sub-internetworking resources of the plurality of logical sub-internetworking resources, wherein the first and second logical sub-internetworking resources are not coupled; and the first and second logical sub-internetworking resources are coupled to produce the intranetworking resource, wherein the intranetworking resource is cost prohibitive.

13. The method of claim 10 further comprises providing notice to a network resource manager associated with the intranetworking resource of the establishing the internetworking service.

14. The method of claim 10, wherein the establishing of the internetworking service further comprises:

performing a loop function to establish the internetworking service, wherein the loop function includes:

identifying a potential internetworking service that includes intranetworking resources of the plurality of intranetworking resources and non-flagged internetworking resources of the plurality of internetworking resources;

determining whether the potential internetworking service will not support the internetworking service due to at least one of the intranetworking resources;

when the potential internetworking service will not support the new internetworking service: flagging at least one of the internetworking resources associated with at least one internetworking resources, and returning to the beginning of the loop function when the plurality of internetworking resources has not been substantially exhausted; and when the potential internetworking service will support the internetworking service, ending the loop function.

15. The method of claim 14 further comprises:

re-determining whether the intranetworking resource will support the networking service when the plurality of internetworking resources has been substantially exhausted; and clearing the flagging of the internetworking resources when the re-determining indicates that the intranetworking resource will not support the networking service.

16. A multinetwork service controller comprises:

a processing module; and memory operably coupled to the processing module, wherein the memory includes operational instructions that cause the processing module to (a) determine whether identified intranetworking resources of a plurality of intranetworking services and identified internetworking resources of a plurality of internetworking resources provide a reliable internetworking service; (b) when the reliable internetworking service cannot be provided due to at least one of the identified intranetworking resources, flag at least one of the identified internetworking resources that is associated with the at least one of the intranetworking resources to produce at least one flagged internetworking resource when the reliable internetworking service cannot be provided due to at least one of the identified intranetworking resources; and (c) establish a new internetworking service using newly identified intranetworking resources of the plurality of intranetworking resources and newly identified internetworking resources of the plurality of internetworking resources, wherein the newly identified intranetworking resources are exclusive of the at least one intranetworking resource and the newly identified internetworking resources are exclusive of the at least one flagged internetworking resource when the new internetworking service can be established with exclusion of the at least one flagged internetworking resource.

17. The multinetwork service controller of claim 16, wherein the memory further comprises operational instructions that cause the processing module to, when the new internetworking service cannot be established with exclusion of the at least one flagged internetworking resource, establish the new internetworking service with a minimal number of a plurality of flagged internetworking resources, wherein the at least one flagged internetworking resource includes the plurality of flagged internetworking resources.

18. The multinetwork service controller of claim 16, wherein the memory further comprises operational instructions that cause the processing module to determine the new internetworking service based on at least one of exclusion of the at least one flagged internetworking resource, cost of the internetworking and intranetworking resources, minimal number of hops between the internetworking and intranetworking resources, load balancing of the internetworking and intranetworking resources, and bandwidth of the internetworking and intranetworking resources.

19. The multinetwork service controller of claim 16, wherein the memory further comprises operational instructions that cause the processing module to establish the new internetworking service by performing a loop functions that includes the steps of:

identifying a potential internetworking service that includes intranetworking resources of the plurality of internetworking resources and non-flagged internetworking resources of the plurality of internetworking resources;

determining whether the potential internetworking service will not support the new internetworking service due to at least one of the intranetworking resources;

when the potential internetworking service will not support the new internetworking service: flagging at least one of the internetworking resources associated with the at least one internetworking resources, and returning to the beginning of the loop function when the plurality of internetworking resources has not been substantially exhausted; and when the potential internetworking service will support the new internetworking service, ending the loop function.

20. The multinetwork service controller of claim 19, wherein the memory further comprises operational instructions that cause the processing module to clear the flagging of the internetworking resources when the plurality of internetworking resources has been substantially exhausted and repeat the loop function.

21. The multinetwork service controller of claim 16, wherein the memory further comprises operational instructions that cause the processing module to, for each of a plurality of internetworking services:

independently determine whether corresponding intranetworking resources of the plurality of intranetworking services and corresponding internetworking resources of the plurality of internetworking resources provides a correspondingly reliable internetworking service, wherein the reliable internetworking services is one of the plurality of internetworking services;

when the correspondingly reliable internetworking service cannot be provided due to at least one of the corresponding intranetworking resources, flag at least one of the corresponding internetworking resources that is associated with the at least one of the corresponding intranetworking resources to produce at least one flagged corresponding internetworking resource; and establish a correspondingly new internetworking service using newly identified corresponding intranetworking resources of the plurality of intranetworking services and newly identified corresponding internetworking resources of the plurality of internetworking resources, wherein the newly identified corresponding intranetworking resources are exclusive of the at least one corresponding intranetworking resource and the newly identified corresponding internetworking resources are exclusive of the at least one flagged corresponding internetworking resource when the new internetworking service can be established with exclusion of the at least one flagged corresponding internetworking resource.

22. The multinetwork service controller of claim 16, wherein the memory further comprises operational instructions that cause the processing module to:

receive an indication from a network resource manager affiliated with the at least one of the identified intranetworking resources that the at least one of the identified intranetworking resources is unreliable for supporting the reliable internetworking service, wherein the network resource manager is one of a plurality of network resource managers, wherein each network resource manager manages at least one corresponding one of the plurality of intranetworking resources.

23. A multinetwork service controller comprises:

a processing module; and memory operably coupled to the processing module, wherein the memory includes operational instructions that cause the processing module to (a) determine whether an intranetworking resource provides a reliable networking service; and (b) when the reliable networking service cannot be provided by the intranetworking resource, establishing an internetworking service using at least one intranetworking resource of a plurality of intranetworking resources and at least one internetworking resource of the plurality of internetworking resources, wherein the at least one intranetworking resource is exclusive of the intranetworking resource.

24. The multinetwork service controller of claim 23, wherein the intranetworking resource includes a plurality of logical sub-intranetworking resources.

25. The multinetwork service controller of claim 24, wherein the memory further comprises operational instructions that cause the processing module to determine that the intranetworking resource is unable to provide the reliable networking service based on at least one of:

first and second user network interfaces of the reliable networking service are respectively coupled to first and second logical sub-internetworking resources of the plurality of logical sub-internetworking resources, wherein the first and second logical sub-internetworking resources are not coupled; and the first and second logical sub-internetworking resources are coupled to produce the intranetworking resource, wherein the intranetworking resource is cost prohibitive.

26. The multinetwork service controller of claim 23, wherein the memory further comprises operational instructions that cause the processing module to provide notice to a network resource manager associated with the intranetworking resource of the establishing the internetworking service.

27. The multinetwork service controller of claim 23, wherein the memory further comprises operational instructions that cause the processing module to establish the internetworking service by:

performing a loop function to establish the internetworking service, wherein the loop function includes:

identifying a potential internetworking service that includes intranetworking resources of the plurality of internetworking resources and non-flagged internetworking resources of the plurality of internetworking resources;

determining whether the potential internetworking service will not support the internetworking service due to at least one of the intranetworking resources;

when the potential internetworking service will not support the new internetworking service: flagging at least one of the internetworking resources associated with at least one internetworking resources, and returning to the beginning of the loop function when the plurality of internetworking resources has not been substantially exhausted; and when the potential internetworking service will support the internetworking service, ending the loop function.

28. The multinetwork service controller of claim 27, wherein the memory further comprises operational instructions that cause the processing module to:

re-determining whether the intranetworking resource will support the networking service when the plurality of internetworking resources has been substantially exhausted; and clearing the flagging of the internetworking resources when the re-determining indicates that the intranetworking resource will not support the networking service.

* * * * *